US008863489B2

(12) United States Patent
Landon et al.

(10) Patent No.: US 8,863,489 B2
(45) Date of Patent: Oct. 21, 2014

(54) TINE DRIVE CAM FOR WINDROW MERGER

(75) Inventors: Gregory L. Landon, Marshfield, WI (US); Jacob D. Kappelman, Marshfield, WI (US); James E. Kappel, Marshfield, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 13/075,766

(22) Filed: Mar. 30, 2011

(65) Prior Publication Data

US 2012/0247078 A1  Oct. 4, 2012

(51) Int. Cl.
| | |
|---|---|
| A01D 57/04 | (2006.01) |
| A01D 78/00 | (2006.01) |
| A01D 57/28 | (2006.01) |
| A01D 89/00 | (2006.01) |
| A01B 73/04 | (2006.01) |
| A01B 73/06 | (2006.01) |
| A01D 84/00 | (2006.01) |

(52) U.S. Cl.
CPC .............. *A01D 78/001* (2013.01); *A01D 57/28* (2013.01); *A01D 89/002* (2013.01); *A01B 73/046* (2013.01); *A01B 73/067* (2013.01); *A01D 84/00* (2013.01)
USPC .............................................. 56/221; 56/192

(58) Field of Classification Search
USPC ........... 56/221, 220, 222, 14.4, 370, 364, 192
See application file for complete search history.

(56) References Cited

U.S. PATENT DOCUMENTS

| | | | |
|---|---|---|---|
| 1,387,176 A | 8/1921 | Price et al. | |
| 1,927,458 A | 9/1933 | Klise | |
| 2,008,470 A | 7/1935 | Rall et al. | |
| 2,195,381 A | 3/1940 | Patterson | |
| 2,256,829 A | 9/1941 | Hyman | |
| 2,343,583 A | 3/1944 | Rogers | |
| 2,388,212 A * | 10/1945 | McElhoe et al. | 56/364 |
| 2,893,537 A * | 7/1959 | Krahn | 198/513 |
| 3,016,235 A | 1/1962 | Cnudde | |
| 3,177,638 A | 4/1965 | Johnson | |
| 3,199,604 A * | 8/1965 | Lorenzen et al. | 171/27 |
| 3,229,454 A * | 1/1966 | Oshanyk | 56/364 |
| 3,404,517 A * | 10/1968 | Whitfied et al. | 56/16.5 |
| 3,472,008 A * | 10/1969 | Hurlburt | 56/226 |

(Continued)

FOREIGN PATENT DOCUMENTS

| | | |
|---|---|---|
| EP | 0 286 776 A1 | 10/1988 |
| EP | 0 443 079 A2 | 8/1991 |

(Continued)

OTHER PUBLICATIONS

New York Times, William Neuman, *Amber Waves to Ivory Bolls*, B 1, Mar. 28, 2011 (New York, New York), 3 pages.

(Continued)

*Primary Examiner* — Árpáad Fáián-Kovács
(74) *Attorney, Agent, or Firm* — Patterson Thuente Pedersen, P.A.

(57) ABSTRACT

A windrow merger having a plurality of rotationally driven tines that rotate around a non-circular cam to vary the rotational speed of the times. The tines extend from the cam on elongated cam followers such that the tines are moved through a flicking motion as the tines are rotated around the cam. The window merger also has an internal drive assembly positioned in an internal aperture around which the rotatable tines are rotated.

2 Claims, 11 Drawing Sheets

(56) References Cited

U.S. PATENT DOCUMENTS

| | | | |
|---|---|---|---|
| 3,545,185 A * | 12/1970 | Dorsett et al. ............... 56/14.6 |
| 3,650,096 A | 3/1972 | Caldwell |
| 3,695,015 A | 10/1972 | Twidale et al. |
| 3,699,751 A | 10/1972 | Ross et al. |
| 3,714,766 A | 2/1973 | Ender et al. |
| 3,751,888 A * | 8/1973 | James ............... 56/130 |
| 3,754,383 A * | 8/1973 | Burrough et al. ............... 56/14.4 |
| 3,849,974 A * | 11/1974 | James ............... 56/226 |
| 3,940,910 A * | 3/1976 | d'Acremont ............... 56/14.4 |
| 3,983,683 A * | 10/1976 | James ............... 56/364 |
| 4,084,394 A | 4/1978 | van der Lely |
| 4,161,859 A | 7/1979 | Storm et al. |
| 4,167,843 A * | 9/1979 | Kampman et al. ......... 56/16.4 R |
| 4,184,314 A | 1/1980 | Hobbs |
| 4,240,446 A | 12/1980 | Raymond |
| 4,297,833 A * | 11/1981 | Gaeddert ............... 56/364 |
| 4,353,201 A * | 10/1982 | Pierce et al. ............... 56/364 |
| 4,359,854 A | 11/1982 | Witzel |
| 4,369,590 A * | 1/1983 | Miller ............... 37/231 |
| 4,409,780 A | 10/1983 | Beougher et al. |
| 4,487,004 A | 12/1984 | Kejr |
| 4,495,756 A | 1/1985 | Greiner et al. |
| 4,658,572 A | 4/1987 | Honey et al. |
| 4,700,535 A | 10/1987 | Wessel |
| 4,738,092 A | 4/1988 | Jennings |
| 4,768,334 A | 9/1988 | Honey et al. |
| 4,793,129 A | 12/1988 | Ehrhart et al. |
| 4,903,470 A | 2/1990 | Hemker et al. |
| 4,910,951 A | 3/1990 | Reilly et al. |
| 4,928,462 A * | 5/1990 | Lippens et al. ............... 56/341 |
| 4,981,013 A | 1/1991 | Underwood |
| 4,996,833 A | 3/1991 | Von Allowerden |
| 5,005,342 A | 4/1991 | Lundahl et al. |
| 5,007,235 A * | 4/1991 | Nickel et al. ............... 56/12.4 |
| 5,107,663 A | 4/1992 | Wattron et al. |
| 5,111,636 A | 5/1992 | Quirin |
| 5,136,828 A | 8/1992 | Ermacora |
| 5,155,986 A | 10/1992 | Kelderman |
| 5,163,277 A | 11/1992 | Fransgaard |
| 5,177,944 A | 1/1993 | Finlay |
| 5,199,249 A | 4/1993 | Wattron et al. |
| 5,199,250 A | 4/1993 | Ermacora et al. |
| 5,203,154 A | 4/1993 | Lesher et al. |
| 5,231,826 A * | 8/1993 | Jennings ............... 56/11.4 |
| 5,272,860 A | 12/1993 | Baril et al. |
| 5,297,665 A | 3/1994 | Smith |
| 5,394,682 A | 3/1995 | Frimml et al. |
| 5,423,165 A | 6/1995 | Walch et al. |
| 5,507,139 A | 4/1996 | Delperdang et al. |
| 5,566,536 A * | 10/1996 | Krafka et al. ............... 56/15.2 |
| 5,911,625 A | 6/1999 | Von Allworden |
| 5,964,077 A | 10/1999 | Guinn |
| 5,987,861 A * | 11/1999 | Duncan et al. ............... 56/14.4 |
| 6,050,075 A | 4/2000 | Waldrop |
| 6,079,194 A | 6/2000 | Waldrop |
| 6,131,379 A | 10/2000 | Ehn, Jr. |
| 6,170,244 B1 * | 1/2001 | Coers et al. ............... 56/226 |
| 6,199,703 B1 | 3/2001 | Boese |
| 6,205,757 B1 | 3/2001 | Dow et al. |
| 6,212,865 B1 | 4/2001 | Peeters et al. |
| 6,279,304 B1 | 8/2001 | Anstey et al. |
| 6,401,440 B1 | 6/2002 | Franet et al. |
| 6,442,918 B1 * | 9/2002 | Fox ............... 56/221 |
| 6,502,379 B1 * | 1/2003 | Snider ............... 56/221 |
| 6,591,598 B2 * | 7/2003 | Remillard et al. ............... 56/226 |
| 6,601,375 B1 | 8/2003 | Grahl et al. |
| 6,697,724 B2 | 2/2004 | Beck |
| 6,715,274 B2 | 4/2004 | Peeters et al. |
| 6,775,969 B2 | 8/2004 | Wuebbels et al. |
| 6,843,045 B2 * | 1/2005 | Bickel ............... 56/14.4 |
| 6,862,873 B2 | 3/2005 | Franet |
| 6,935,488 B2 | 8/2005 | Dow et al. |
| 6,971,225 B1 | 12/2005 | Kempf et al. |
| 6,978,588 B2 | 12/2005 | Kormann |
| 6,986,241 B2 | 1/2006 | Beck |
| 7,028,459 B2 | 4/2006 | Lohrentz et al. |
| 7,051,505 B2 | 5/2006 | Brannstrom |
| 7,070,042 B2 | 7/2006 | Dow et al. |
| 7,107,748 B2 | 9/2006 | McClure |
| 7,131,253 B2 * | 11/2006 | Remillard et al. ............... 56/14.4 |
| 7,204,074 B2 | 4/2007 | Bandstra et al. |
| 7,207,581 B2 | 4/2007 | Osborne et al. |
| 7,252,169 B2 | 8/2007 | McLean et al. |
| 7,310,929 B2 | 12/2007 | Dow et al. |
| 7,350,343 B2 | 4/2008 | Beck |
| 7,404,283 B2 | 7/2008 | Viaud |
| 7,448,196 B2 | 11/2008 | Schrag et al. |
| 7,470,082 B2 | 12/2008 | Lloyd |
| 7,478,523 B2 | 1/2009 | McClure et al. |
| 7,526,908 B1 | 5/2009 | Rice et al. |
| 7,552,577 B2 | 6/2009 | Strosser |
| 7,555,883 B2 | 7/2009 | Fackler et al. |
| 7,574,851 B1 | 8/2009 | McLean et al. |
| 7,594,563 B2 | 9/2009 | Lutz |
| 7,603,837 B2 | 10/2009 | Ehrhart et al. |
| 7,624,561 B2 | 12/2009 | McLean et al. |
| 7,628,004 B2 | 12/2009 | Geiser |
| 7,635,299 B2 | 12/2009 | Murray et al. |
| 7,665,287 B2 * | 2/2010 | Jones ............... 56/364 |
| 7,669,392 B2 | 3/2010 | Ehrhart |
| 7,673,439 B2 | 3/2010 | Geiser |
| 7,703,266 B2 | 4/2010 | Fackler et al. |
| 7,707,811 B1 | 5/2010 | Strosser |
| 7,743,594 B1 | 6/2010 | Wanner et al. |
| 7,814,736 B2 | 10/2010 | Blakeslee et al. |
| 7,827,774 B2 | 11/2010 | Dow et al. |
| 8,091,331 B2 | 1/2012 | Dow et al. |
| 8,096,102 B2 * | 1/2012 | Smith ............... 56/364 |
| 8,156,723 B1 * | 4/2012 | McClure et al. ............... 56/364 |
| 8,186,138 B2 | 5/2012 | Dow et al. |
| 2003/0074876 A1 | 4/2003 | Patterson et al. |
| 2003/0110752 A1 | 6/2003 | Dow |
| 2004/0200203 A1 | 10/2004 | Dow et al. |
| 2005/0210855 A1 * | 9/2005 | Bandstra et al. ............... 56/341 |
| 2006/0162308 A1 | 7/2006 | Dow et al. |
| 2006/0248870 A1 | 11/2006 | Geiser |
| 2006/0254240 A1 | 11/2006 | Krone et al. |
| 2006/0254244 A1 | 11/2006 | Geiser |
| 2007/0144130 A1 | 6/2007 | Geiser |
| 2009/0139196 A1 | 6/2009 | McLean et al. |
| 2009/0241503 A1 | 10/2009 | Babler et al. |
| 2009/0282800 A1 | 11/2009 | Gantzer |
| 2010/0037584 A1 | 2/2010 | Dow et al. |
| 2011/0094200 A1 | 4/2011 | Dow et al. |
| 2012/0247078 A1 | 10/2012 | Landon et al. |

FOREIGN PATENT DOCUMENTS

| | | |
|---|---|---|
| EP | 0 651 940 B1 | 5/1995 |
| GB | 2 215 971 A | 10/1989 |
| IT | 159252 | 2/1987 |
| IT | 01282454 | 3/1998 |
| IT | 01289646 | 10/1998 |
| IT | 01290202 | 10/1998 |
| RU | 2231242 | 6/2004 |
| WO | WO 87/06793 | 11/1987 |
| WO | WO 93/05641 | 4/1993 |

OTHER PUBLICATIONS

ROC America, *Description RT 950*, p. 1, http://www.roc.ag/Pagine/1600/EN/RT_950.htm?idguida=3 (last visited Dec. 17, 2010), 2 pages.

Art's Way Manufacturing Co., Inc., *Welcome to Art's Way Manufacturing Co., Inc.*, p. 1, Armstrong, IA, http://www.artsway-mfg.com/ (visited Dec. 17, 2010), 1 page.

Praktijk Mechanisatie, *Snel schud-/harksysteem*, p. 32 (Jul. 21, 2000) with English Translation (2 pages), 3 pages.

Monosem, Inc., *Lit Sheets and Brochures*, p. 1-2, http://www.monosem-inc.com/lit.sheets.html (visited Feb. 15, 2011), 2 pages.

Monosem, Inc., *Stacker Bar Mounted NG Plus 4 Operator and Parts Manual*, Chapter 3-3.1 to 3.14, 2009 (Edwardsville, KS), 16 pages.

John Deere, Inc., *1720 Integral Stack Fold Planter*, Moline, IL, p. 1-2, (56) References Cited

OTHER PUBLICATIONS http://www.deere.com/servlet/ProdCatProduct?pNbr=1720RH&tM=FR (visited Feb. 15, 2011), 2 pages.

John Deere, Inc., *637 Three-Section & Five-Section Tandem Disks*, Moline, IL, p. 1-2, http://www.deere.com/servlet/ProdCatProduct?tM=FR&pNbr=0637XN (visited Feb. 15, 2011), 2 pages.

John Deere, Inc., *2410 Chisel Plow*, Moline, IL, p. 1-2, http://www.deere.com/servlet/ProdCatProduct?tM=FR&pNbr=2410XN (visited Feb. 15, 2011), 2 pages.

John Deere, Inc., *512 Disk Ripper*, Moline, IL, p. 1-2, http://www.deere.com/servlet/ProdCatProduct?tM=FR&pNbr=0512XN (visited Feb. 15, 2011), 2 pages.

John Deere, Inc., *770 SPFH Corn Head*, p. 1, Moline, IL, http://www.deere.com/servlet/ProdCatProduct?tM=FR&pNbr=0770_KM (visited Feb. 15, 2011), 1 page.

Case IH, *1200 Series Advanced Seed Meter Planters* (brochure), p. 1, 18, Racine, WI, available at http://www.caseih.com/en_us/Products/PlantingSeeding/Pages/1200-planters.aspx (click link *1200 Series Planter Brochure*) (visited Feb. 15, 2011), 2 pages.

Case IH, *NPX2800 Fertilizer Applicators* (brochure), p. 1-6, Racine, WI, available at http://www.caseih.com/en_us/Products/Application/Pages/fertilizer-applicators.aspx (click link *NPX2800 Fertilizer Applicators Brochure*) (visited Feb. 15, 2011), 6 pages.

Case IH, *Seedbed Conditioners* (Crumbler 110 and 160), p. 1, Racine, WI, http://www.caseih.com/en_us/Products/Tillage/Pages/seedbed-conditioners.aspx (visited Feb. 15, 2011), 1 page.

Agco, Inc., *8700 Stacker Toolbar Planter*, p. 1, Russell, KS, http://www.agcoiron.com/default.cfm?PID=1.25.9.2 (visited Feb. 15, 2011), 1 page.

Agco, Inc., *8700 Rigid & Vertical Fold Planters*, p. 1, Russell, KS, http://www.agcoiron.com/default.cfm?PID=1.25.9.1 (visited Feb. 15, 2011), 1 page.

Orthman Manufacturing Inc., *Stacking Toolbars*, p. 1, Lexington, NE, http://www.orthmanag.com/products/stacking-toolbars (visited Feb. 15, 2011), 1 page.

Orthman Manufacturing Inc., *Folding Toolbars*, p. 1, Lexington, NE, http://www.orthmanag.com/products/folding-toolbars (visited Feb. 15, 2011), 1 page.

Harvestec, *Harvestec Folding Corn Heads*, p. 1, Oakville, Ontario, Canada, http://www.harvestec.com/Products03.html (visited Feb. 15, 2011), 1 page.

CLAAS of America Inc., *Orbis*, p. 1-2, Omaha, NE http://www.claas.com/countries/generator/cl-pw/en/claas-US/products/fh/jaguar900series/attachment/orbis/start,lang=en_US.html (visited Feb. 15, 2011), 2 pages.

Krone NA Inc., *Big X 700|850|1100 Brochure*, p. 13, Memphis, TN, available at http://www.krone-na.com/BiGX_700_850_1100.pdf (visited Feb. 15, 2011), 2 pages.

Art's Way Manufacturing Co., Inc., *Land Planes*, p. 1-2, Armstrong, IA, http://www.artsway-mfg.com/products/land-planes/land-planes-product-and-information/ (visited Feb. 15, 2011), 2 pages.

\* cited by examiner

TINE DRIVE CAM FOR WINDROW MERGER

TECHNICAL FIELD

The present invention relates to a farm implement. More particularly, the present invention relates to a device for merging one or more windrows in a field.

BACKGROUND OF THE INVENTION

When a feed product, such as alfalfa, is ready to be harvested, the product may be cut and then raked into long, generally parallel windrows in the field. In cases in which the product is too moist for further processing, the product is typically left in such windrows to afford drying of the product by the wind and sun in the field. After several days of drying in the field, the windrow is typically picked up and the product may be either stored or further processed, such as by baling.

In order to minimize the number of windrows that must be picked up, it makes economic sense to merge one or more of the windrows into a single larger windrow. Such merging minimizes the number of passes through the field that are necessary to pick up the crop. Accordingly, there is a need in the industry for ever more efficient windrow mergers. Typically, a merger may have three individual pick up heads positioned adjacent one another when in the working disposition. Each pick-up head is typically powered by an individual hydraulic motor. In the past, the hydraulic motor was positioned at an end of the pick-up head. In such disposition, the hydraulic motor prevented adjacent pick-up heads from being disposed proximate each other. Accordingly, there was a significant gap between the conveyors of each of the adjacent pick-up heads and crop being transported on the conveyor was lost through the gap.

Additionally, in the past, the tines of the pick-up head were driven at a constant rotational speed. Accordingly, the crop that had been picked up was transported at a constant speed to be deposited unevenly and at the forward edge of the conveyor.

Further, prior art mergers were susceptible to a bouncing action induced in the two outboard pick-up heads as a result of passage over a rough field surface. Such bouncing caused the pick-up heads to miss picking up crop that was laying the field. Additionally, it would be desirable to be able to provide a bias to the outboard pick-up head merging the pick-up heads to stay in contact with the underlying ground. As an aid to this, it would be desirable to have a selectable adjustable height of the pick-up heads relative to the underlying ground.

Finally, it may be desirable to offset the windrow merger with respect to the towing tractor such that an outboard pick-up head would follow directly behind the tractor and the center pick-up head and the second outboard pick-up head would be displaced laterally with respect to the directing of travel of the tractor.

SUMMARY OF THE INVENTION

The windrow merger of the present invention substantially meets the aforementioned needs of the industry. The individual pick-up heads of the windrow merger are driven by an internally disposed hydraulic motor. Such disposition eliminates the need for a hydraulic motor disposed on an end of an individual pick-up head. Accordingly, the individual pick-up heads can be disposed very close to one another when in the working disposition. The gap existing between adjacent conveyors is minimized to the point that crop being transferred from a conveyor to an adjacent conveyor experiences virtually no loss in making the transition between the adjacent conveyors.

An additional feature of the windrow merger of the present invention is cam driven tines. The effect of the cam is to accelerate the tangential rotational speed of the tines proximate the apex of tine motion. The effect of the acceleration of the tines is to accelerate the speed of the crop being carried by the tines such that the crop does not merely drop onto the leading edge of the conveyor but is effectively spread out across the full width dimension of the conveyor by means of a flicking motion imparted to the crop by the accelerated tines.

A further feature of the instant windrow merger is a respective hydraulic accumulator that is hydraulically in communication with a respective actuator that is coupled to an individual outboard pick-up head. The effect of the hydraulic accumulator is pressurized upon upward motion of the outboard pick-up head. After passing the rise in the ground, the accumulator transfers such hydraulic pressure back to the actuator to extend the actuator, thereby exerting a downward bias on the individual outboard pick-up heads in order to minimize bounce of the individual outboard pick-up head over uneven underlying ground.

A further feature of the windrow merger of the present invention is individually adjustable height of the individual pickup heads above the ground and of the merger itself. To accomplish this, the skids that are disposed beneath the individual pick-up heads are mounted to the frame of the respective pick-up head by means of a shiftable mount. Preferably, the shiftable mount is comprised of a pair of actuators that can set the distance between the skid and the pick-up head frame as desired to effect varying heights of the respective pick-up head above the underlying ground. Additionally, the truck assembly is shiftable relative to the remainder of the chassis member such that the chassis member may be positioned at a selected height above the underlying ground.

A further feature of the windrow merger of the present invention is that the wheels on the truck assembly are steerable. By such steering, it is possible to offset the track of the windrow merger as compared to the towing tractor in order to displace the windrow merger either right or left with respect to the direction of travel of the towing tractor.

BRIEF DESCRIPTION OF THE DRAWINGS

FIG. 4a is a cut-away view of the portion of the pick-up head of FIG. 4 as depicted in the rectangle 4a;

DETAILED DESCRIPTION OF THE DRAWINGS

The windrow merger of the present invention is shown generally at 10 in the figures. Merger 10 includes two major components, chassis member 12 and pick-up head members 14, 16, and 18.

The chassis member 12 of the merger 10 includes four major subcomponents; mount assembly 20, tongue assembly 22, support assembly 24, and truck assembly 26.

Figure 1:
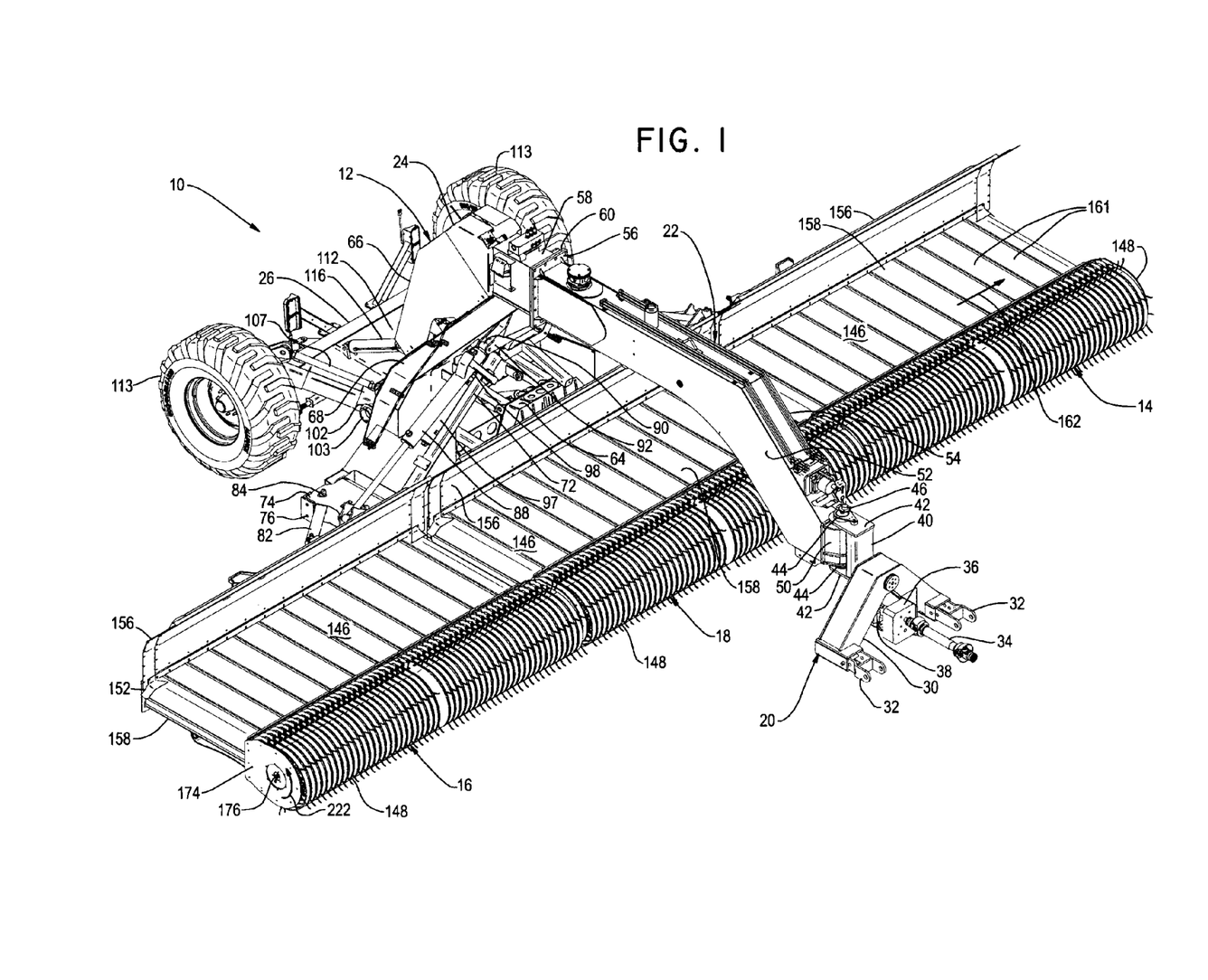
FIG. 1 is a front quarter perspective view of the windrow merger of the present invention.

Turning first to the mount assembly 20, as depicted in FIG. 1, an arched, boxed frame 30 includes a pair of forward directed couplers 32 for removably coupling to a tractor or other towing vehicle. A PTO shaft 34 is operably coupled at a first end to a gear box 36. The PTO shaft 34 may be coupled at its second end to the PTO of a tractor. The gear box 36 is preferably disposed in the arch defined by the frame 30 and is coupled to a hydraulic pump 38. Preferably, the gear box 36 is useful for either stepping up or reducing the rpm available at the PTO shaft of the tractor. A shackle 40 is fixedly coupled to the rear of the arched frame 30. The shackle 40 includes a pair of spaced apart shackle brackets 42. Each of the shackle brackets 42 has a bore 44 defined therein, the bores 44 being in registry. A pin 46 may be received within the two bores 44.

The tongue assembly 22 of the chassis member 12 includes at its proximal end a receiver 50. The receiver 50 is sized such that the receiver 50 may be disposed in the aperture defined between the shackle brackets 42. The pin 46 may be received within a bore (not shown) defined with the receiver 50 for pivotally coupling the tongue assembly 22 to the mount assembly 20.

Figure 2:
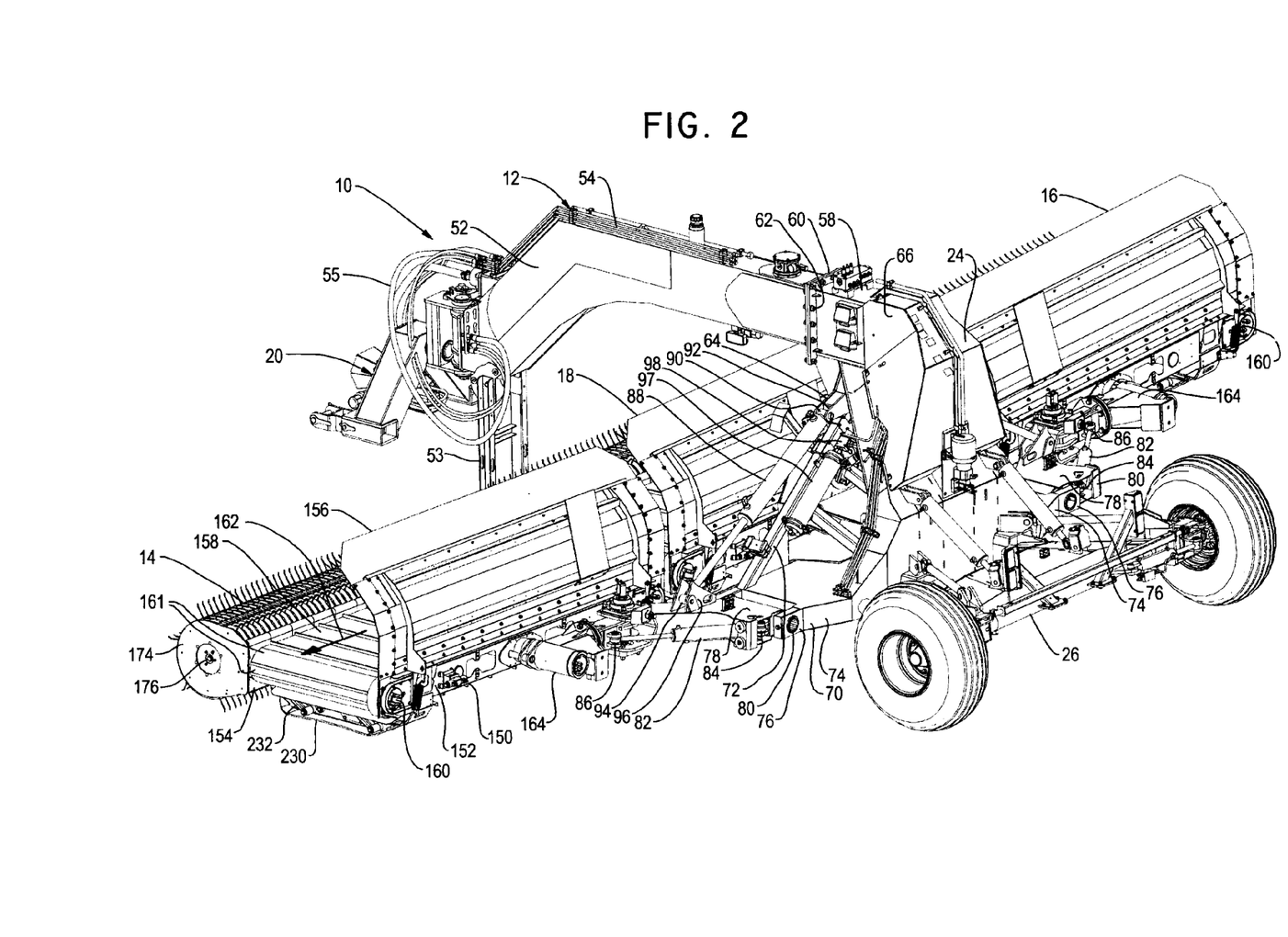
FIG. 2 is a rear quarter perspective view of the windrow merger.

The receiver 50 is fixedly coupled to a boxed tongue 52. The boxed tongue 52 preferably rises at an angle and then extends rearward in a generally horizontal disposition to overlie the pick-up head member 18. As depicted in FIG. 2, a removable support 53 may be disposed beneath the boxed tongue 52 to support the forward portion of the merger 10 when the merger 10 is not connected to a tractor or the like.

A plurality of hard hydraulic lines 54 are disposed on the upward directed surface of the tongue 52. At their proximal ends, the hydraulic lines 54 are coupled by flexible hydraulic lines 55 (see FIG. 2) that are coupled to the hydraulic pump 38. At their distal ends, the hard hydraulic lines 54 are coupled by flexible hydraulic lines (not shown, but that are similar to the flexible hydraulic lines 55) to the various actuators that are described below.

The distal end of the boxed tongue 52, terminates in a flange 56. A boxed member 58 is disposed rearward of the distal end of the tongue 52. The boxed member 58 includes a flange 60 which is mated to the flange 56 by a plurality of bolts disposed in bores defined in the respective flanges 56, 60. Structure 64 depends from the boxed member 58. A rear cover 66 and a pair of essentially mirror image side covers 68 are coupled to the depending structure 64. The depending structure 64, the rear cover 66 and the two side covers 68 comprise components of the support assembly 24.

The support assembly 24 includes a generally triangular shaped fixed structure 70. The apex of this triangular shape depends from the boxed member 58. It should be noted that passing a vertical plane through the longitudinal axis of the tongue 52 as depicted in FIG. 1 splits the merger 10 into two mirror image halves, the components described below being replicated on both sides of the plane.

Figure 10:
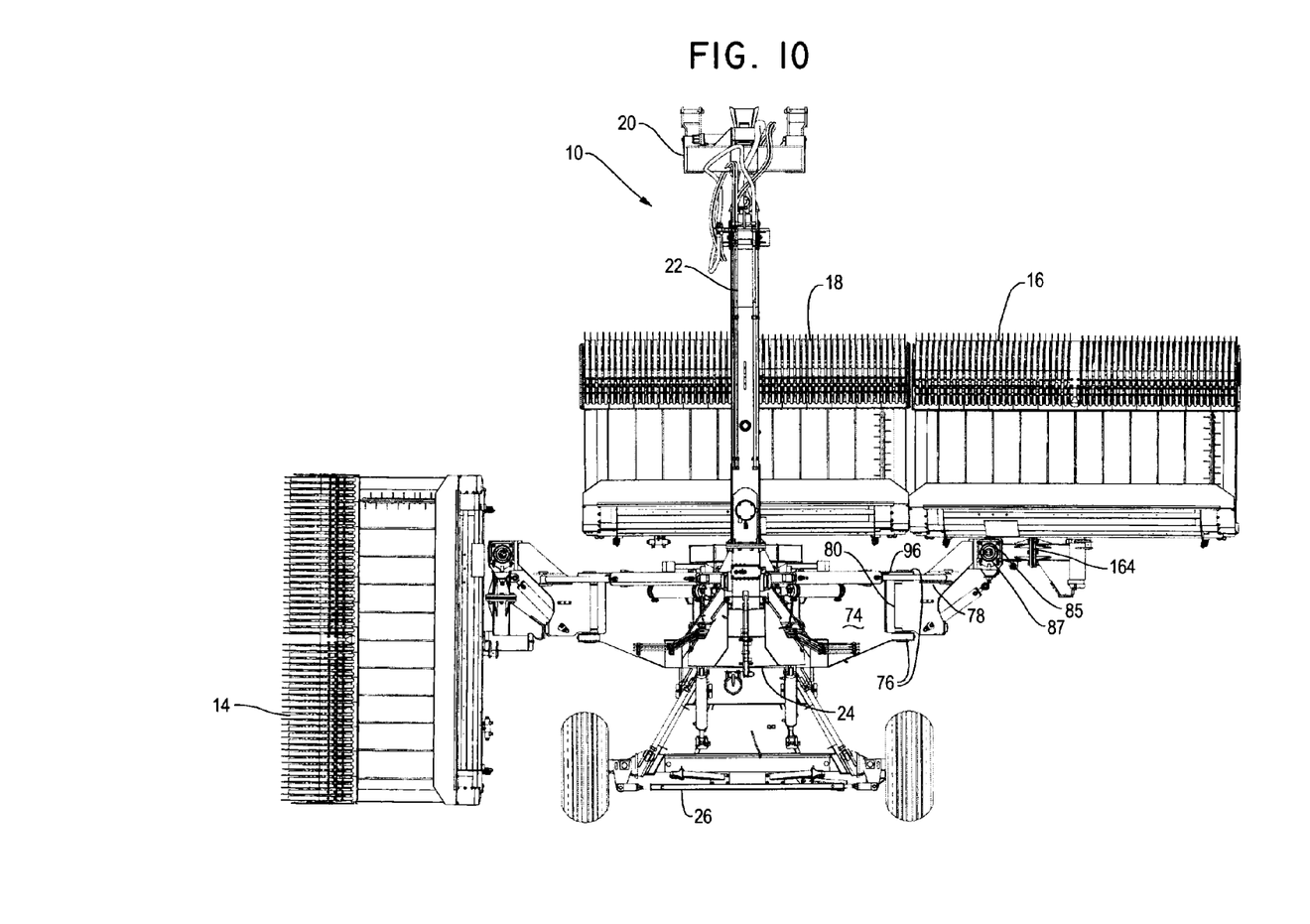
FIG. 10 is a top planform view of the windrow merger in a transition disposition between the transport disposition and the working disposition.

The fixed structure 70 of the depending structure 64 includes at least in part a support beam 72. The support beam 72 is affixed to a base support 74. The base support 74 includes a pair of outward directed and spaced apart brackets 76. See also FIG. 10. Each of the brackets 76 has a bore (not shown) defined therein and a pin 80 disposed in the bores defined in the respective brackets 76. The pin 80 extends from bracket 76 to bracket 76. The pin 80 pivotally couples a head support 78 to the base support 74. The head support 78 is pivotable about the pin 80, the axis of rotation being the longitudinal axis of the pin 80 which is essentially a fore-aft axis.

A translation actuator 82 operably couples the head support 78 to a respective one of the pick-up head members 14, 16. See also FIG. 6. The translation actuator 82 has a cylinder end coupling 84 that is pivotally coupled to the head support 78. The translation actuator 82 further has a piston end coupling 86 that is pivotally coupled to a respective pick-up head member 14, 16 by means of a generally vertically disposed pin 87 disposed in a coupler 85.

A further actuator is coupled to the head support 78. This actuator is the lift actuator 88. The lift actuator 88 has a cylinder end coupling 90 that is pivotally coupled to the support assembly 24 by means of the fixed structure 70 proximate the apex thereof. Such coupling is by means of a bracket 92, the bracket 92 having a pin 93 therein. A piston end coupling 94 of the lift actuator 88 is pivotally coupled to the head support 78 by means of a bracket 96, the bracket 96 having a pin 95 disposed in a pair of bores (not shown) defined in the bracket 96.

A hydraulic accumulator 97 is preferably affixed to the support beam 72. The hydraulic accumulator 97 is fluidly coupled to the lift actuator 88 by flexible hydraulic lines not shown, but similar to lines 55 noted above. A remotely controllable valve 98 is affixed to the hydraulic accumulator 97. The valve 98 is shiftable between a disposition in which the hydraulic accumulator 97 is fluidly coupled to the lift actuator 88 and a disposition in which the hydraulic accumulator 97 is fluidly isolated from the lift actuator 88.

The truck assembly 26 is the fourth assembly of the chassis member 12 and is rotatably coupled to the fixed structure 70 by means of a pair of spaced apart pins 103, a pair of adjustable links 107, and a pair of actuators 116, described in greater detail below.

Figure 8:
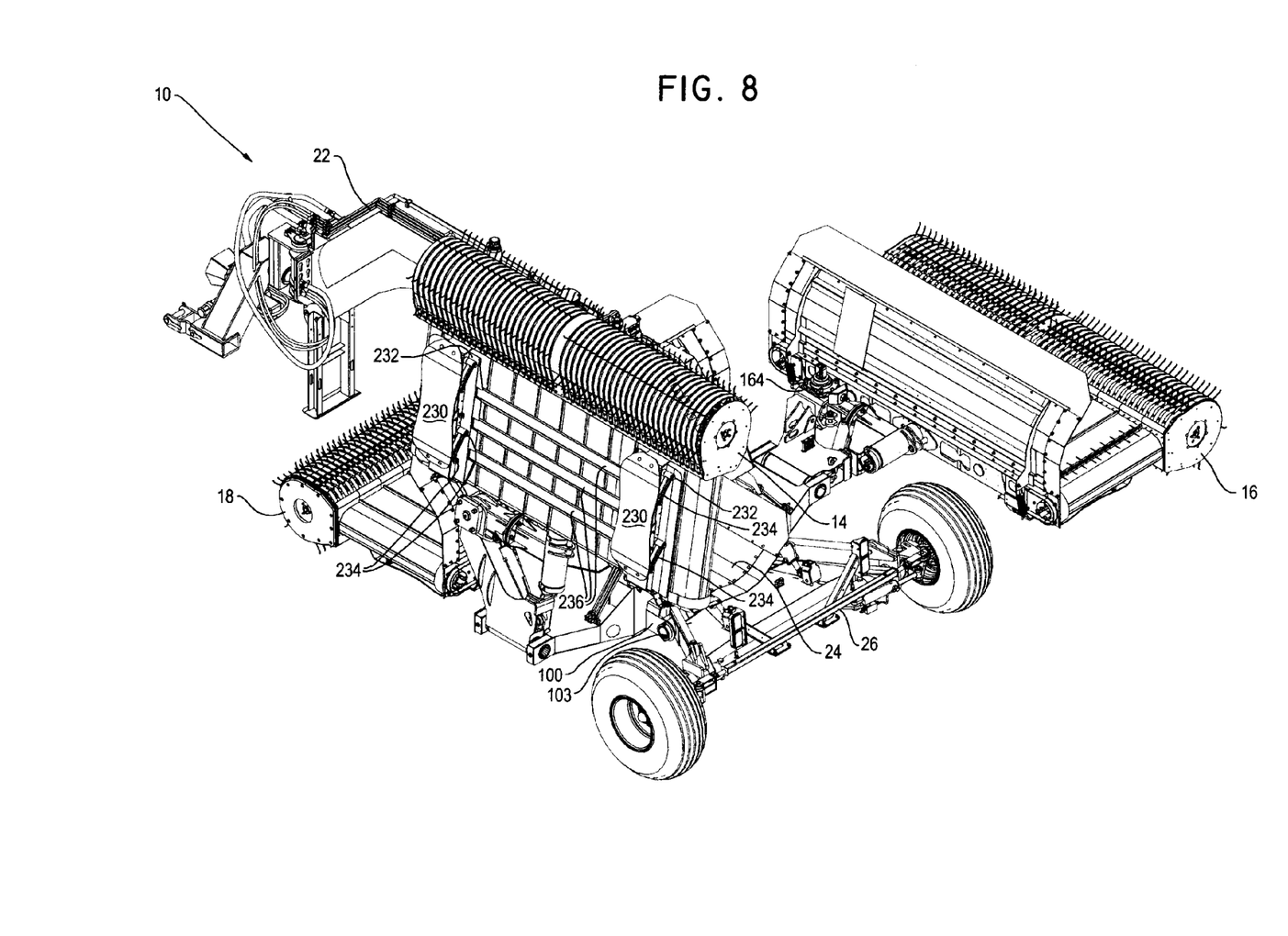
FIG. 8 is a perspective view of the windrow merger with a pick-up head in the first transitional disposition and a pick-up head in the folded transport disposition.

Accordingly in order to effect the above noted coupling, as depicted in FIG. 8, a pair of truck brackets 100 are fixedly coupled to the structure 70. The truck brackets 100 are pivotally coupled to a coupler 102 affixed to an axle plate 112 by means of the pin 103. A pair of link brackets 104 are fixedly coupled to the structure 70. Each of the link brackets 104 is pivotally coupled to a respective adjustable link 107 by means of a pin 106. See FIG. 3. The final means of coupling the truck assembly 26 to the structure 70 are the actuators 116. Accordingly, a pair of actuator brackets 100 are fixedly coupled to the structure 70. Each of the respective actuator brackets 108 are pivotally coupled to an actuator 116 by means of a pin 110.

The fourth assembly of the chassis member 12 is the truck assembly 26. The truck assembly 26 generally is disposed rearward of the chassis member 12 is operably pivotally coupled to the support assembly 24 as noted above. The truck assembly 26, best viewed in FIGS. 1-3, includes an axle plate 112 and a wheel assembly 113. The axle plate 112 is transversely mounted with respect to the longitudinal axis of the merger 10. The upper surface of the axle plate 112 includes a pair of upward directed spaced apart actuator brackets 114. Each of the actuators 116 has a piston and coupler 118 that is coupled to the bracket 114 by means of a transverse pin 119.

Each of the actuators 116 additionally has a cylinder end coupler 120 is pivotally coupled to the respective actuator bracket 108 by a pin 110, as noted above.

The wheel assembly 113 includes a pair of spaced apart, mirror image wheel suspensions 122. Each of the wheel suspensions 122 includes a substantially vertically disposed king pin 124. The wheel suspension 122 is free to rotate about the king pin 124. A steering actuator 126 is operably coupled to each of the respective wheel suspension 122. The steering actuator 126 includes a piston end coupler 128 that is coupled to the wheel suspension 122 offset from a stub axle 130 and the king pin 124. A cylinder end coupler 132 of the steering actuator 126 is pivotally coupled to a steering bracket 134 mounted proximate the rear margin of the axle plate 112.

The wheel assembly 113 further includes a rim 136 rotatably mounted to the stub axle 130 and a preferably pneumatic tire 138 mounted on the rim 136.

A pair of spaced apart markers 140 are operably coupled to the upper margin of the axle plate 112. The markers 140 may be reflectors and/or electric lights.

The second members of the merger 10 of the pick-up head members 14, 16, and 18. It should be noted that each of the pick-up head members 14, 16, 18 is virtually identical, so that the description below applies to all three. The pick-up head members 14, 16, 18 include two major subassemblies, conveyor assembly 146 and pick-up assembly 148.

Figure 3:
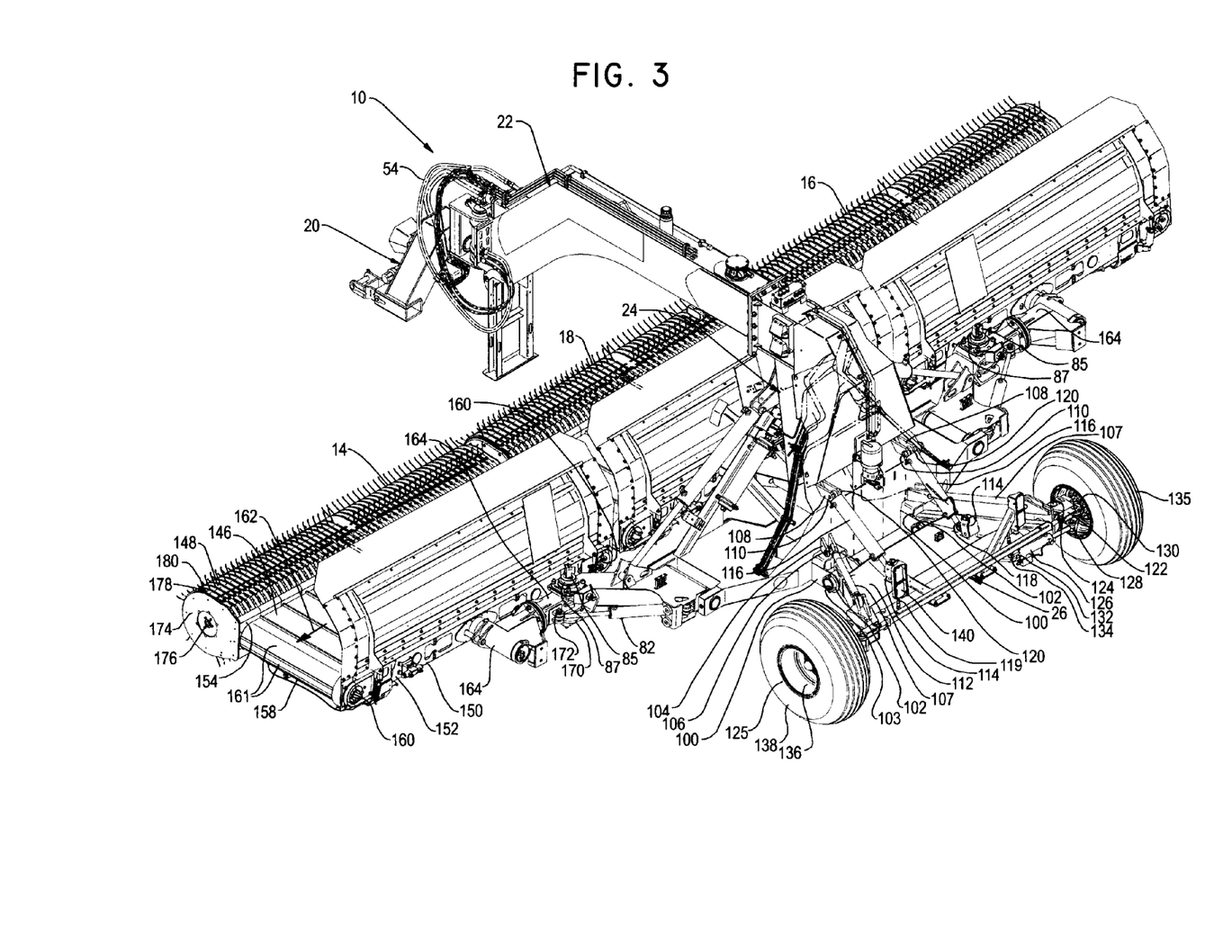
FIG. 3 is a rear quarter perspective view of the windrow merger.
Figure 7:
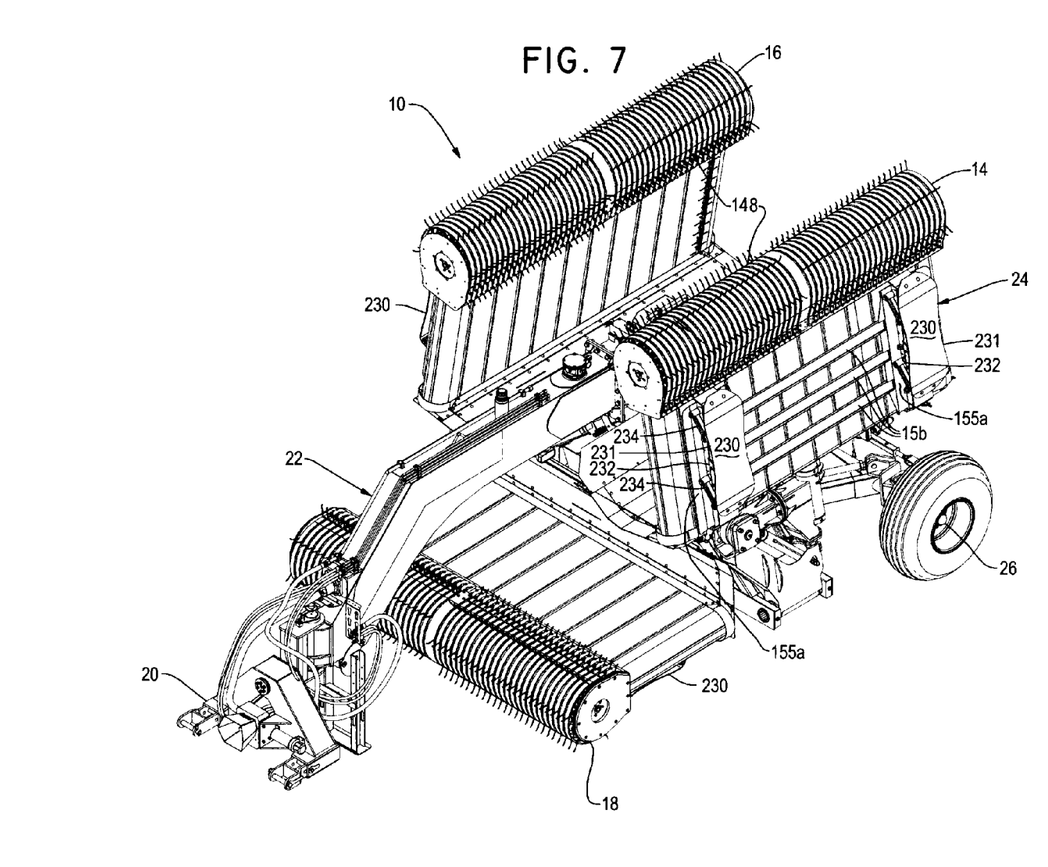
FIG. 7 is a perspective of the windrow merger in the transport disposition.

The conveyor assembly 146 is best viewed in FIGS. 3, 7 and 8. Each of the conveyor assemblies 146 includes a frame 150. The frame 150 includes a rear rail 152 and a front rail 154. A plurality of frame members 155 extend between the rear rail 152 and the front rail 154.

A forward arching deflector 156 is fixedly coupled to the rear rail 152 and partially overlies a conveyor 158.

The conveyor 158 is endless and is supported by a pair of spaced apart rotatable axles 160. The conveyor 158 is formed of a plurality of linked segments 161. The upper surface of the conveyor 158 translates as indicated by the arrow 162. Accordingly, crop deposited on the conveyor 158 is transferred leftward in the depiction of FIG. 3.

A preferably hydraulic drive system 164 is mounted on the rear face of the rear rail 152.

The hydraulic drive system 164 is operably coupled to the conveyor 158 for imparting the travel indicated by the arrow 162 to the conveyor 158.

The second subassembly of the pick-up head members 14, 16, 18 is the pick-up assembly 148. The pick-up assembly 148 of each of the pick-up head members 14, 16, 18 includes a generally planar end plate 174. The end plate 174 preferably includes a recessed mount 176 for an interiorly disposed drive shaft bearing (not shown). As described below, the drive shaft bearing rotatably supports a drive shaft 196. The planar end plate 174 is a highly advantageous feature of the merger 10. By being planar and not obstructed other items (specifically, prior art mergers typically have a motor for rotationally driving tines disposed on the endplate), adjacent pickup head members are capable of being brought into very close proximity. Such closeness facilitates minimal interruption in the pickup of crop along the full front face to the pick-up head members 14, 16, 18. Additionally, the space between adjacent conveyor assemblies 146 is minimized and crop loss that might occur during the transfer of crop to an adjacent conveyor assembly 146 is minimized.

The pick-up assembly 148 of each of the pick-up head members 14, 16, 18 further include a plurality of spaced apart, semi-circular fixed spacers 178. A plurality of rotatable tines 180 project through the apertures defined between adjacent fixed spacers 178.

Figure 4:
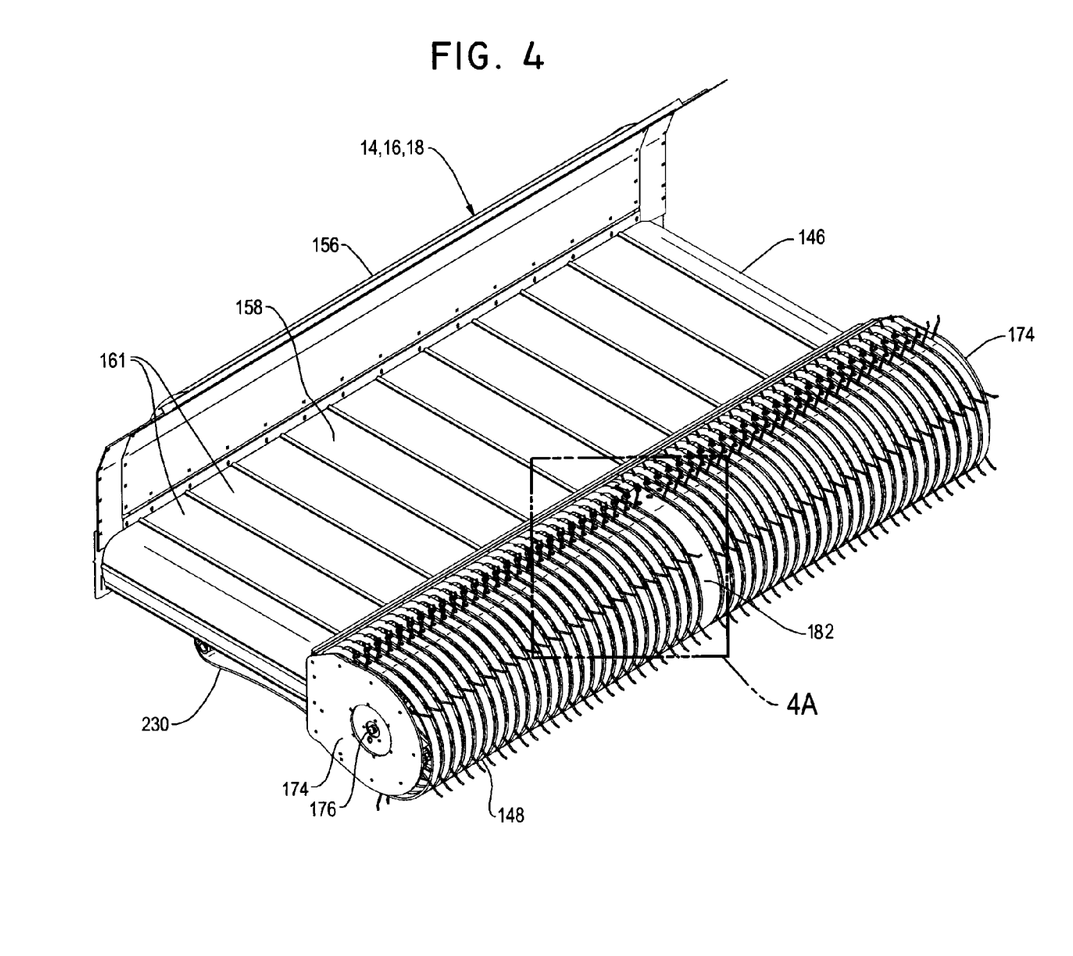
FIG. 4 is a perspective view of a pick-up head.
Figure 4A:
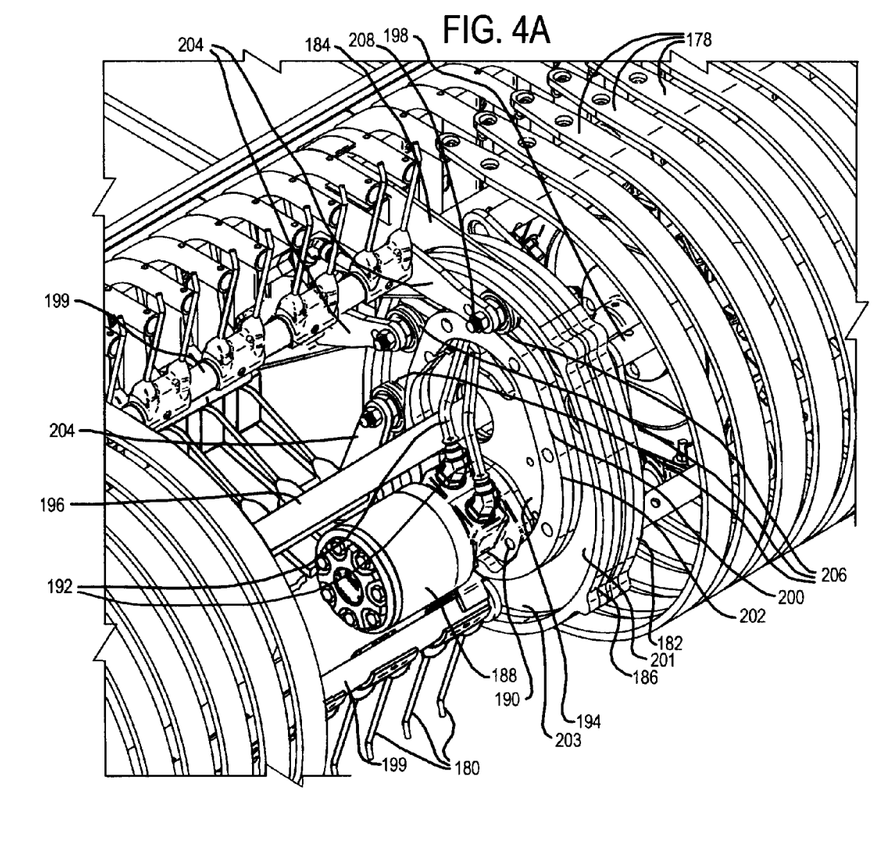

The rotatable tines 180 are powered by an internal drive assembly 182 as depicted in FIGS. 4, 4a. The internal drive assembly 182 includes a drive mount plate 184 that is fixedly coupled to a housing 186. The drive mount plate 184 fixes the internal drive assembly 182 within the generally circular aperture defined internal to the fixed spacers 178 and the tines 180. It is significant to note that the internal drive assembly 182 is positioned approximately midway between the two end plates 174 of a respective pickup head member 14, 16, 18, as indicated in FIG. 4. The disposition of the internal drive assembly 182 within the internal aperture defined by the fixed spacers 178 and the tines 180 frees up the end plates 174 so that adjacent pick-up head members 14, 16, 18 can be disposed very closely together thereby ensuring a more efficient pick-up of crop and lateral conveying of the crop once picked up.

A motor 188 is mounted on the housing 186. The mounting is effected by mating a flange 190 to the housing 186 preferably by means of bolts. At least two hydraulic lines 192 provide hydraulic fluid to the motor 188.

The housing 186 provides a mount for a transmission 194. The transmission 194 preferably is comprised of two meshed gears, preferably of the same size. The 1:1 ratio of the gears of the transmission 194 preferably matches the revolutional speed of the drive shaft 196 to the output shaft of the motor 188.

One of the gears in the transmission 194 is fixedly coupled to the drive shaft 196, 198. He drive shaft 196, 198. Is operably coupled to a plurality of tine mounting shafts 199, such that rotation of the drive shaft 196, 198 by the motor 188 results in imparting rotational motion to the tine mounting shafts 199.

A cam 200 is fixedly coupled to the housing 186. The cam 200 has a channel 201 defined between an inner cam race 202 and an outer cam race 203. A cam follower 204 is fixedly coupled to each of the plurality of tine mounting shafts 199. Each of the cam followers 204 includes a roller 206 coupled proximate an end of the cam follower 204 by means of a coupler 208. The follower arm 210 of the cam follower 204 is coupled to the tine mounting shaft 199 by means of a welded coupler 212. The coupler 212 additionally fixedly couples the tine 216 of the rotatable tine 180 to the tine member mounting shaft 199.

Figure 5:
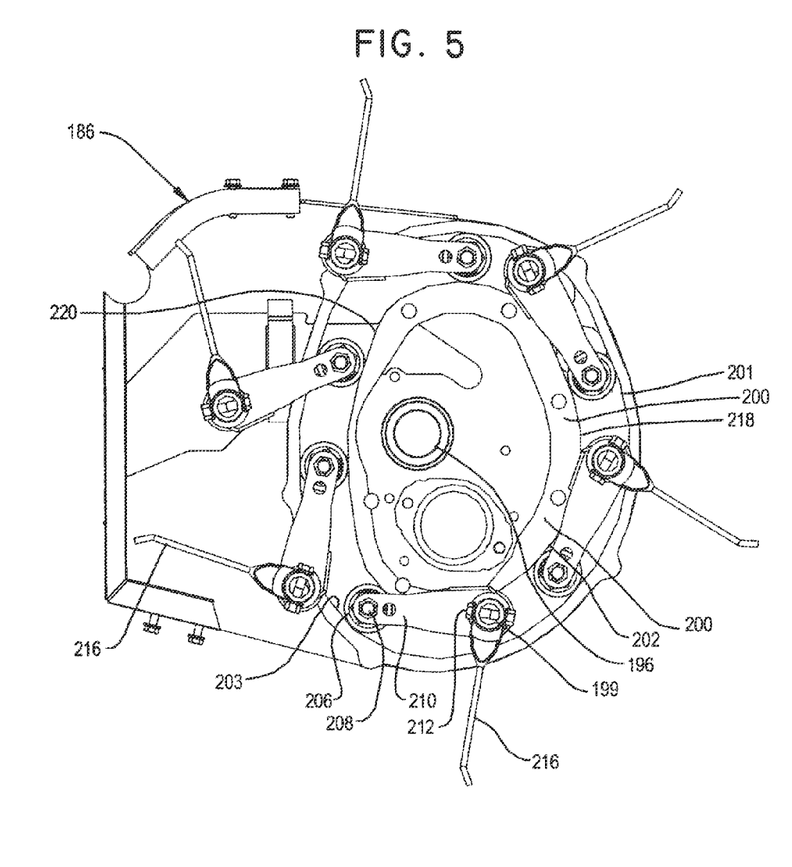
FIG. 5 is a side elevational view of a cam.

Referring to FIG. 5, it should be noted that the cam 200 has a generally oval shape, peaking at an apex at the top and at the bottom of the cam 200. Accordingly, a lesser arc 220 is presented at the top and bottom of the cam 200 and a greater arc 218 is presented by the cam 200 at its forward face and at its rearward face, forward being defined as to the right in FIG. 5 and rearward as being defined as to the left in FIG. 5.

Figure 6:
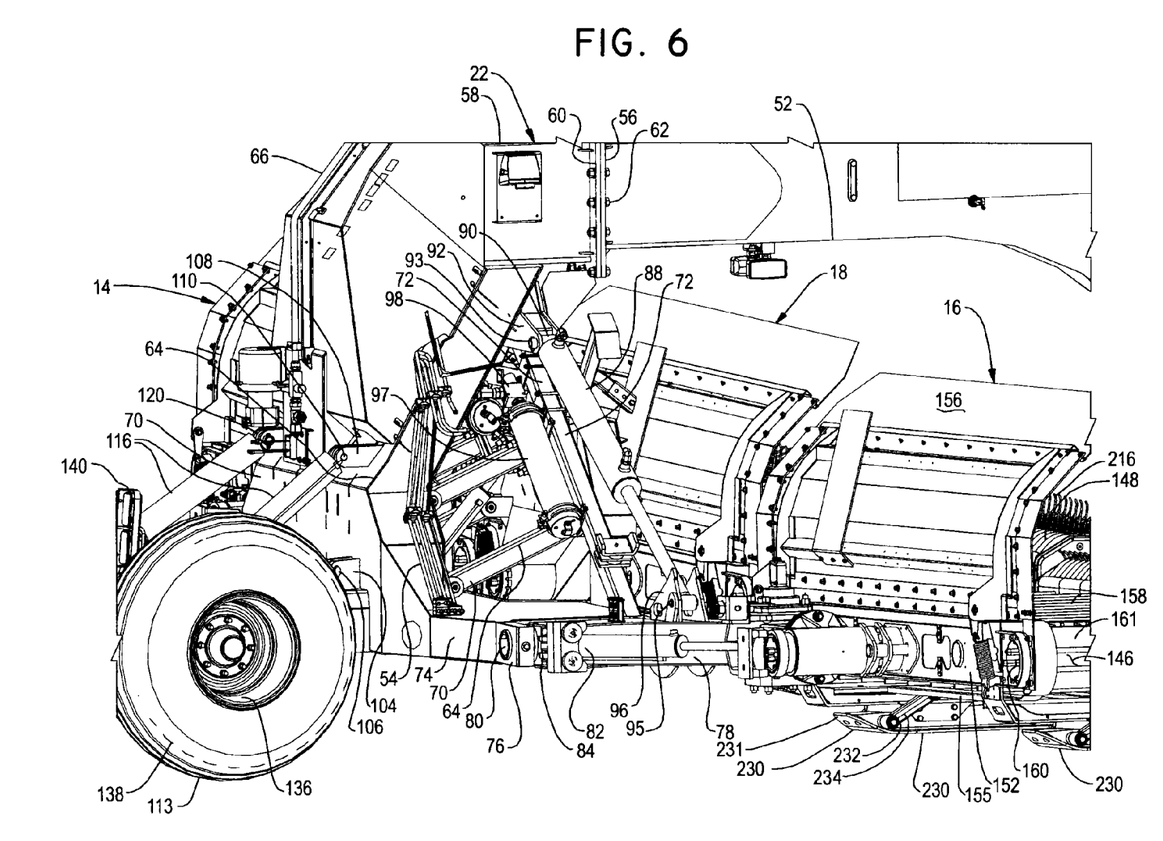
FIG. 6 is a side rear perspective view of the lower structure of the right side of the windrow merger.

FIGS. 6-8 depict a pair of skid plates 230 mounted beneath each of the pick-up head members 14, 16, 18. Each of the skid plates 230 includes a ground engaging plate 231. The plate 231 is mounted on a shiftable mount 232. The shiftable mount 232 includes a pair of actuators 234. The actuators 234 are coupled at a first end to the plate 231 and at a second end to the frame 150. Selective porting of hydraulic fluid to the actuators 234 shifts the plate 231 relative to the underside of the respective pick-up head members 14, 16, 18, thereby setting the desired height of the respective pick-up head members 14, 16, 18 relative to the underlying ground.

In operation, the merger 10 is shiftable between a transport disposition (FIG. 7) and a working disposition (FIGS. 1-3). In the transport disposition, the two pick-up head members 14 and 16 are in an elevated disposition with the pick-up assemblies 148 thereof defining the uppermost dimension of the merger 10. As noted above, pick-up head member 18 is fixed and remains essentially in the same disposition that pick-up head member 18 assumes during working operations. The truck assembly 26 may be rotated relative to the support assembly 24 to elevate the merger 10 above the underlying ground as desired. This is affected by extending actuators 116, thereby causing the truck assembly 26 to rotate above the pin 103 and assume the position more tucked under the chassis member 12 of the merger 10.

Figure 9:
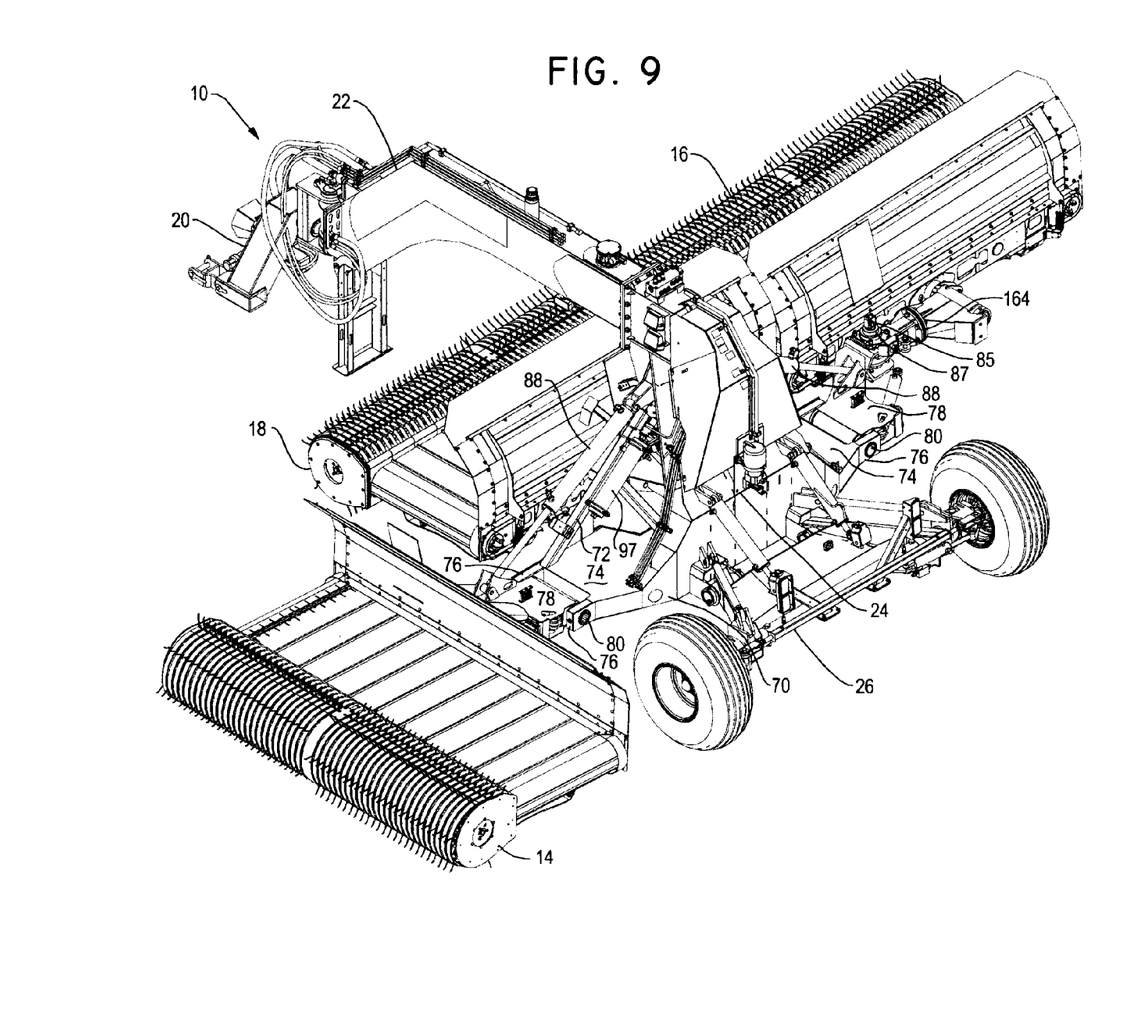
FIG. 9 is a perspective view with an outboard pick-up head in the working disposition and a second outboard working head in the first transitional disposition.

Shifting the merger 10 from the transport disposition to the working disposition involves a number of steps. Preferably, such shifting is effected by moving one pick-up head member 14, 16 at a time in order to conserve on the volume of high pressure hydraulic fluid required to complete the operation. Accordingly, in the depiction of FIG. 8, pick-up head member 16 has been shifted from the essentially vertical disposition of FIG. 7 to a substantially horizontal disposition. Such shifting is effected by extending lift actuator 88, thereby causing the respective pick-up head member 14, 16 to rotate about the pin 80. This disposition is depicted for pick-up head member 16 in FIG. 8 and pick-up head member 14 in FIG. 9.

The next step is to rotate the respective pick-up head member 14, 16 through an arc of approximately 90 degrees into alignment with the pick-up head member 18 in the working disposition. Such action is effected by extending the translation actuator 82, thereby causing the respective pick-up member 14, 16 to rotate about the essentially vertically disposed pin 87 of the coupler 85.

Once the three pick-up head members 14, 16, 18 are disposed in the working disposition depicted in FIGS. 1-3, the height of the merger 10 relative to the underlying ground may be adjusted as desired by moving the shiftable mount 232 of the respective skid plates 230 to set the respective plates 231 a desired distance from the underside of the respective pick-up head members 14, 16, 18. Additionally, the truck assembly 26 may be rotated to a desired position relative to the support assembly 24 in order to adjust the rear portion of the merger 10 relative to the underlying ground.

As the merger 10 is towed across a field, the pick-up head members 14 and 16 are subject to rise and fall responsive to undulations in the underlying ground. Accommodating the rise, the respective pick-up head members 14, 16 is beneficial, but it is also important to bring the respective pick-up head members 14, 16 back into contact with the ground as the ground falls away. Accordingly, the merger 10 employed a hydraulic accumulator 97 fluidly coupled to a respective lift actuator 88. As the respective pick-up head member 14, 16 rises, the piston of the respective lift actuator 88 is forced back into its cylinder. Such action increases the pressure of the hydraulic fluid in the lift actuator 88. This rise in pressure can be transferred to the hydraulic accumulator 97 and is available there to be transferred back to the lift actuator 88 as the respective pick-up head member 14, 16 drops back down. As such, the recovered hydraulic pressure of the lift actuator 88 acts to force the respective pick-up head member 14, 16 downward after having passed over a rise in the underlying ground. Should such action not be desired, the valve 98 is available in order to isolate the accumulator 97 from the lift actuator 88.

Pick-up of the crop in a field is affected by the rotating tine member 216 and the crop is merged by conveyance on the respective conveyors 158. The tine member 216 are typically rotated in the direction as indicated by arrow 222 of FIG. 1. Accordingly, the tine member 216 pick-up crop and translated upward across the leading face of the respective pick-up assembly 148. As the roller 206 coupled to a respective tine member 216 approaches the apex of the cam 200, effective rotational speed of the tine member 216 is accelerated thereby imparting a flicking motion to the crop being conveyed by the tine member 216. Such motion causes the crop to be spread rather more evenly across the full width of the conveyor 158. The crop is then conveyed to the outboard end of the pick-up head member 14 and deposited in a windrow on the ground.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A windrow merger, comprising:
   a plurality of tines each respective tine having a tine member tip and being operably, fixedly coupled to a selected one of a plurality of mounting shafts, each of the plurality of mounting shafts being operably coupled to a central drive shaft, the central drive shaft being operably coupled to a drive motor and to the plurality of mounting shafts, the drive motor being approximately midway between two ends of a pick up head, the drive motor, upon actuation, rotationally driving the plurality of mounting shafts for elevating a crop to be merged, each respective tine mounting shaft being fixedly coupled to an elongated cam follower, the elongated cam follower having a first end and an opposed second end, a roller being connected to each respective elongated cam follower proximate the first end, the roller being operably coupled to a cam and disposed in a cam channel, the cam comprising at least a first lesser arc, the first lesser arc being positioned such that, as each roller traverses the lesser arc, the roller motion imparts an accelerated rotational speed to the tine member tip whereby the crop is impelled from the tine, and;
   a motor having a first and a second drive shaft, each respective drive shaft being operably coupled to respective tine mounting shafts.

2. The windrow merger of claim 1, the rotational speed of the tine members being accelerated just prior to discharge of the crop being elevated by the tine members.

* * * * *